Aug. 27, 1929.  E. WILDHABER  1,726,051
METHOD OF PRODUCING GEARS
Original Filed Jan. 25, 1924   3 Sheets-Sheet 1
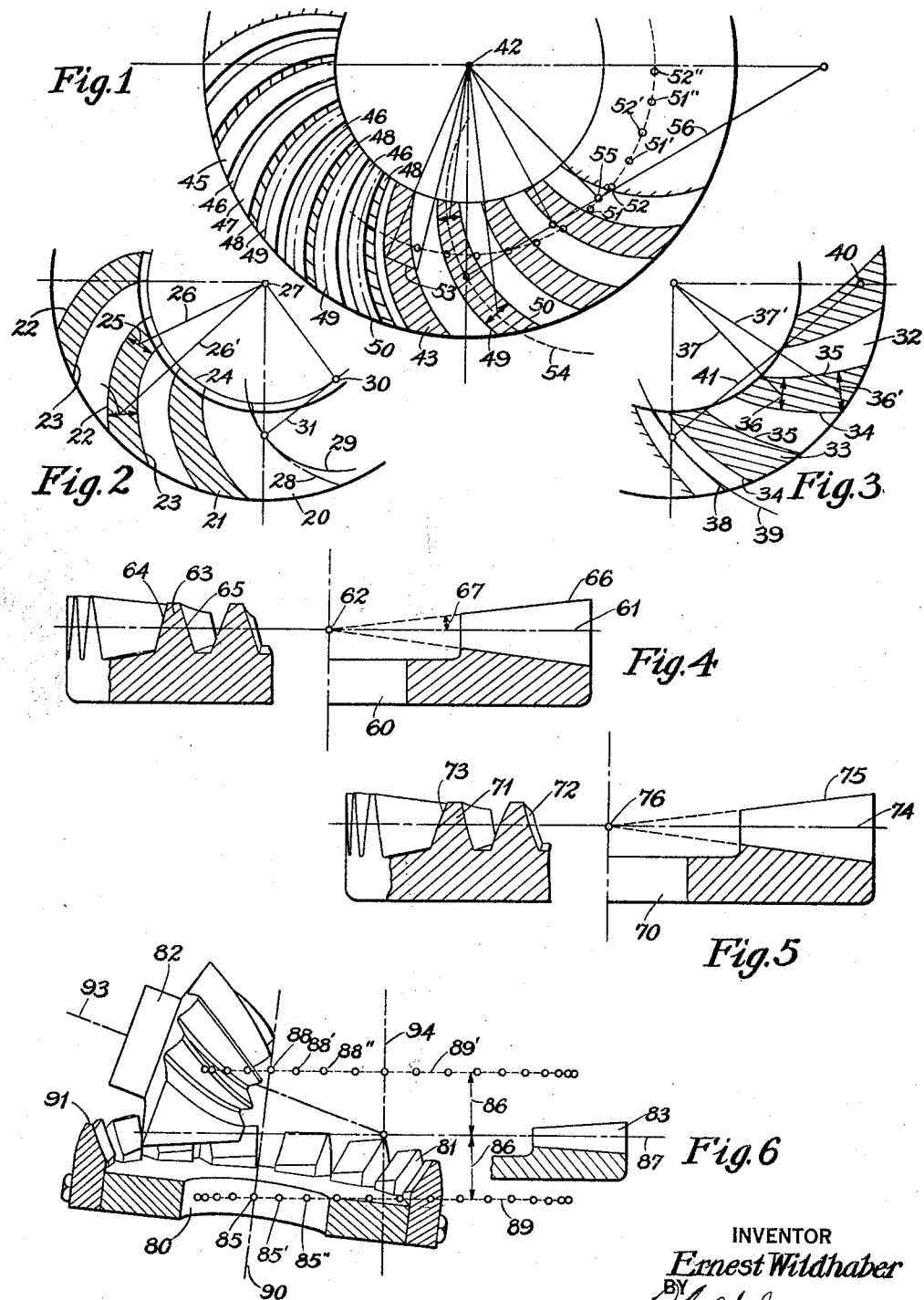
INVENTOR
Ernest Wildhaber
BY
ATTORNEY INVENTOR
Ernest Wildhaber
BY
ATTORNEY Aug. 27, 1929.   E. WILDHABER   1,726,051
METHOD OF PRODUCING GEARS
Original Filed Jan. 25, 1924   3 Sheets-Sheet 3

INVENTOR
Ernest Wildhaber
BY
*[signature]*
ATTORNEY

Patented Aug. 27, 1929.

1,726,051

UNITED STATES PATENT OFFICE.

ERNEST WILDHABER, OF BROOKLYN, NEW YORK, ASSIGNOR TO GLEASON WORKS, OF ROCHESTER, NEW YORK, A CORPORATION OF NEW YORK.

METHOD OF PRODUCING GEARS.

Original application filed January 25, 1924, Serial No. 688,374. Divided and this application filed May 13, 1927. Serial No. 191,219.

The present invention relates to a method of producing longitudinally curved tooth gears and particularly to a method of producing longitudinally curved tooth or spiral bevel gears, whose tooth surfaces are either surfaces of revolution, or more frequently, such composite surfaces as may be derived from a surface of revolution by a rolling-generating action.

The primary object of this invention is to provide a method for cutting spiral bevel gears in which the tooth surfaces of each member of the pair may be cut two sides simultaneously without any sacrifice in tooth strength. To this end, a primary purpose of this invention is to provide a method for cutting spiral bevel gears with tooth spaces of substantially constant angular width and with substantially constant dedendum angles, so that the gears may be provided with teeth of gradually tapering width along their length and with tooth bottoms running substantially to their pitch cone apexes. In this way the gears may be cut in a rapid operation and made just as strong as gears whose tooth surfaces are cut one side at a time.

A further purpose of the present invention is to provide a method whereby mate gears of a spiral bevel gear pair may be generated conjugate to complementary basic gears whose pitch cone angles are supplementary and which have teeth of gradually tapering width and substantially constant addendum angles.

A further object of this invention is to provide a method whereby both members of a pair of spiral bevel gears may be generated with the same tool.

Other objects of the invention will be apparent hereinafter from the specification and the recital of the appended claims.

My invention will be explained with reference to the accompanying drawings, in which:

Figure 1 is a plan view, partly in section, of a crown gear constructed according to this invention;

Figures 2 and 3 are sections along the pitch planes of other crown gears, illustrating, by way of comparison, the advantages of the present invention;

Figure 4 is a side elevation, partly in section, of a crown gear of the type shown in Figure 1, having tooth surfaces which are conical surfaces of revolution;

Figure 5 is a corresponding view of a crown gear of the type shown in Figure 1, having tooth surfaces which are portions of spherical surfaces of revolution;

Figure 6 is a side elevation, partly in section, illustrating, somewhat diagrammatically, the method of generating a spiral bevel gear according to this invention and showing a milling tool in cutting engagement with a spiral pinion blank;

Figure 10:
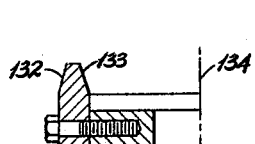
Figure 11:
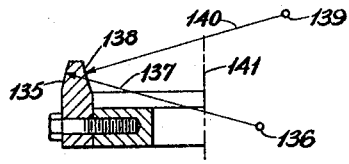
Figure 12:
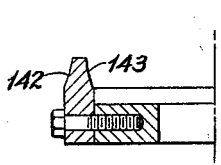
Figure 13:
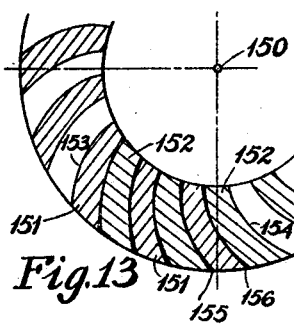
Figure 15:
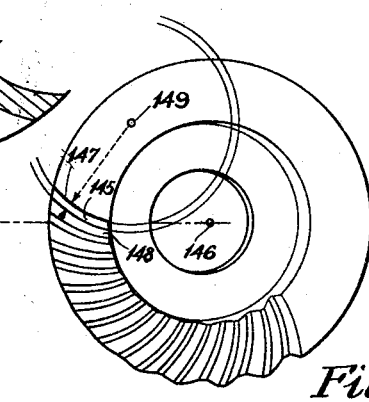
Figure 14:
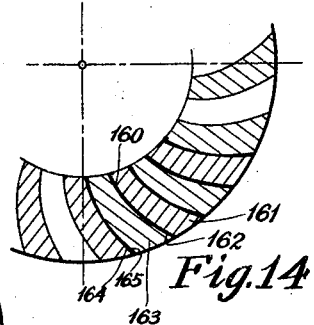
Figure 16:
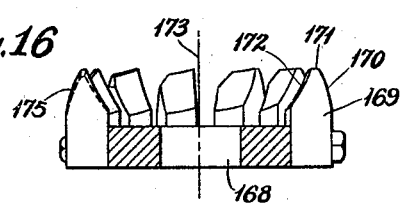
Figure 17:
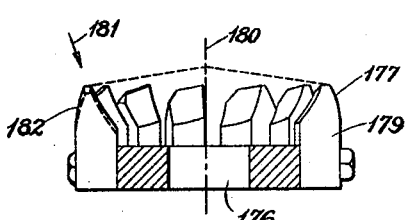
Figures 18, 19:
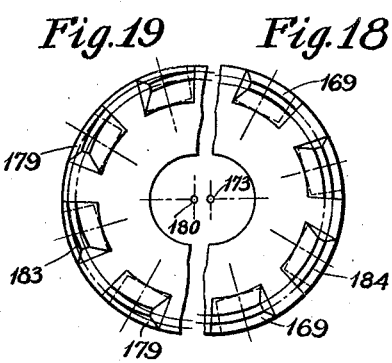

Figures 10 to 12, inclusive, are axial sections of various forms of tools such as may be employed in practising this invention;

Figure 13 illustrates the development of the pitch cones of a meshing pair of gears constructed according to one embodiment of this invention;

Figure 14 is a similar view of a pair of gears constructed according to another modification of this invention;

Figure 15 is a plan view of a spiral bevel gear constructed according to this invention;

Figures 16 and 17 are axial sections of face milling cutters such as might be employed in producing gears according to my invention; and Figures 18 and 19 are partial plan views, respectively, of the milling cutters shown in Figures 16 and 17.

This application is a division of my copending application No. 688,374, filed January 25, 1924. The present application covers the method of producing spiral bevel gears of the type described in the prior application mentioned.

The present invention has to do principally with the generation of spiral bevel gears and its principal purpose is to provide a method whereby two tooth sides of a spiral bevel gear may be cut simultaneously while producing a substantially constant dedendum angle on the gears and tooth spaces of substantially constant angular width. The present invention permits of producing gears with tooth bottoms which run substantially to the pitch cone apexes and with teeth which taper in width longitudinally. The cutting of the gears two side faces simultaneously makes for rapidity in production, while the taper of the teeth in width and their taper in depth in proportion to the taper of the gear itself provides gears just as strong as gears whose tooth surfaces are cut one side at a time.

It is customary to define and describe bevel gearing by defining and describing the crown gear, that is, the gear which forms the basis of the system and to which the bevel gears, themselves, are generated conjugate. In Figure 1, is shown a crown gear such as might form the basis for a system of bevel gears constructed according to this invention. Figures 2 and 3, show, by way of comparison, two other crown gears having certain distinguishing characteristics, as regards tooth depth and width longitudinally. Each of the crown gears shown is a true crown gear, that is, a gear having a plane pitch surface, or a pitch cone angle of 90°. The crown gear 20, shown in Figure 2, has teeth 21 of involute curvature lengthwise, the pitch lines 22 and 23 of the tooth surfaces being involutes of a base circle 24. The normal tooth thickness 25 of such a gear is constant and the same at various distances 26, 26', from the gear apex or center 27, as well known. The normal tooth thickness of a gear depends not only on the distance from the gear apex, at which the tooth thickness is measured, but also on the inclination of the teeth, that is, on their spiral angle. The involute being a curve of comparatively sharp curvature, that is, of rapidly increasing spiral angle, the inclination of the tooth will change rapidly along the tooth and make up for the difference in apex distance so that teeth of constant normal thickness result.

The teeth of an involute crown gear and of any bevel gear generated therefrom will be of constant or uniform depth, with the consequence that the dedendum angle of the teeth increases with decreasing apex distance. This means, the teeth being of the same depth at the small end as at the large end of the teeth, that the teeth will be weak at the small end of the teeth.

In a limited range, the involute 28 can be approximated by a circle 29 whose center 30 is situated on the normal 31 at the point of tangency of the normal with the base circle 24. This makes it possible to simultaneously cover and represent both sides of a crown gear tooth, whose lengthwise curvature approximates an involute, with a rotary cutting tool moving about an axis 30 perpendicular to the pitch plane of the crown gear. The teeth generated on a bevel gear in a rolling operation, by such a tool, will have approximately the same characteristics as those of the truly involute crown gear, that is, their normal tooth thickness will be substantially constant and the tooth depth substantially constant. What is desired, however, is to have the teeth taper in depth from the small to the large end of the teeth, and especially to have the tooth bottoms run to the cone apex of the gear, whereby the depth of the teeth will taper in proportion to the distance from the cone apex.

The crown gear 32, shown in Figure 3, is provided with teeth 33 curved longitudinally along logarithmic spirals. The pitch lines 34 and 35 of such teeth are logarithmic spirals, which means that the teeth have a constant inclination or spiral angle regardless of apex distance. The tooth thickness 36, 36', is then proportional to the apex distance 37 37', which is analogous to conditions existing in straight tooth bevel gears. This is, of course, a desirable condition.

The logarithmic spiral can be approximated by its curvature circle. Thus the logarithmic spiral 38 can be closely approximated by a circle 39 whose center 40 is situated on a normal line 41. It will be noted that the circle 39 is of much larger radius than the circle 29 of Figure 2. When, however, it is attempted to simultaneously cover and represent both sides of a tooth of a logarithmic spiral crown gear with a rotary cutting tool, and to simultaneously generate both sides of a tooth space of a gear blank conjugate to such a crown gear, it will be found that the axis of the cutting tool must be inclined with respect to the pitch plane of the crown gear to such a degree, that the dedendum angle of the blank decreases rapidly at decreasing apex distances. While the dedendum angle should be about in proportion to the apex distance, it decreases in an approximately logarithmic spiral gear cut in the manner described, nearly twice as fast as in the standard tooth proportions. This is, of course, unsatisfactory.

It will be noted, however, that in the case of the crown gear last mentioned, the dedendum angle of the blank decreases at decreasing apex distance, while in the case of the crown gear of Figure 2, the dedendum angle increases at decreasing apex distance, when, in either case, both sides of a tooth space are cut simultaneously on circular arcs approximating the lengthwise curvature of the teeth of the crown gears in question. Between the two cases, there is necessarily a case, where the dedendum angle of a blank remains substantially constant, even when two tooth sides are simultaneously cut by a single rotary cutting tool. It is this condition which I have discovered and upon which the present invention is based. This case is illustrated in Figure 1.

The left part of Figure 1 is a plan view, looking at right angles to its pitch plane, of a crown gear which may form the basis of a system of bevel gears generated according to this invention, while the right part of this figure is a sectional view taken through the pitch plane of this crown gear. 42 designates the axis of the crown gear and 43 its teeth. The teeth of the crown gear consist of convex sides 45, of tips 46, and of concave sides 47. The tooth bottoms are shown slightly shaded to distinguish them from the tips of the teeth and are designated at 48. The pitch lines 49 and 50 are shown in dot and dash lines on the sides of the teeth in the left of the figure, and in full lines on the right. The convex pitch lines 49 are arcs of circles whose centers are at 51, 51', 51'' etc. and the concave pitch lines 50 are arcs of circles whose centers are located at 52, 52', 52'' etc. The convex pitch lines 49 and the concave pitch lines 50 are parts of equal circles, which are angularly displaced, about the axis 42, from each other. In other words, the angle for which one side of a tooth is displaced from the other side of a tooth is the same at various distances from the apex 42. The angular tooth thickness 53 is constant at any apex distance.

The crown gear shown in Figure 1 has a constant angular tooth thickness and a constant angular width of space. The center of a mean circle 54, that is, a circle drawn symmetrically with reference to the pitch lines 49 and 50 of the opposite sides of the teeth, is at 55 on the normal 56. The diameter of the circle 54 is between the diameters of the circles 29 and 39, and its center 55 is located between their centers 30 and 40. The teeth 43 of the crown gear can be covered and represented, therefore, by a rotary tool moving on a circle 54 about an axis 55.

A crown gear of the type shown in Figure 1 has teeth of substantially constant addendum angle and the axis of the cutting tool may be so inclined, therefore, as to generate gears conjugate to such crown gears with a substantially constant dedendum angle.

Figure 4 is a side elevation, partly in section, of a crown gear of the type shown in Figure 1, provided with teeth of straight profile. Figure 5 is a similar view of a crown gear of the type shown in Figure 1 provided with teeth of curved profile. In Figure 4, the pitch plane of the crown gear 60 is indicated at 61 and the center or apex of the crown gear at 62. The teeth 63 of the crown gear are of straight profile and have tooth sides 64 and 65, which are portions of conical surfaces of revolution. The tops of the crown gear teeth are indicated at 66 and a plane containing these tops will pass through the apex 62, as shown, the crown gear having a constant addendum angle 67 at all distances from the apex 62. A bevel gear generated conjugate to such a crown gear will have a constant dedendum angle corresponding to the constant addendum angle of the crown gear.

The crown gear 70 of Figure 5 has teeth 71 whose side surfaces 72 and 73 are of concave and convex profile, respectively. Preferably, the side tooth surfaces of the teeth of this crown gear are portions of spherical surfaces of revolution. For theoretically correct gearing the sphere centers of the concave sides of the teeth should be the same distances above the pitch plane 74 of the crown gear, as the sphere centers of the convex side of the teeth are below that plane. As is the case in Figure 4, the tips 75 of the teeth 71 of the crown gear 70 lie in a plane which passes through the apex or center 76 of the crown gear, whereby the crown gear has a constant addendum angle and the bevel gears generated conjugate thereto will have a constant dedendum angle, as is desired.

The crown gear teeth shown in Figure 2 are not tapered longitudinally. The crown gear teeth shown in Figure 3 are substantially tapered in longitudinal direction. In the intermediate case, shown in Figures 1, 4 and 5, the crown gear teeth are only very moderately tapered longitudinally, being tapered just so much as results when a rotary cutting tool, covering and representing two tooth sides of a crown gear tooth, is so positioned as to produce a constant dedendum angle.

From what has been said, it will be clear that when the diameter of a rotary cutting tool is so chosen that the tool will cover and represent simultaneously the two tooth sides of a tooth of a crown gear such as shown in Figures 1, 4 and 5 and when such a cutting tool is so positioned that the tips of its cutting blades pass through the apex of the crown gear and a suitable generating motion is imparted between a tapered gear blank and the tool corresponding to the meshing action of a bevel gear and crown gear, a bevel gear will be generated which will have teeth of substantially constant dedendum angle and of gradually tapering depth, as is desired to effect the primary objects of this invention.

Figure 6 shows one method of generating a spiral bevel pinion according to this invention. Here a rotary annular face mill 80 is employed provided with a plurality of cutting blades 81 of circular arc profile. The diameter of this cutting tool is chosen according to the principles already set forth and it is so positioned with reference to the blank 82 that it represents a crown gear 83 having a constant addendum angle and tooth surfaces which are portions of spherical surfaces of revolution. The convex tooth surfaces of this crown gear are parts of convex spherical surfaces of revolution whose centers 85, 85', 85'' etc. are situated at a distance 86 below the pitch plane 87 of the crown gear, while the concave tooth surfaces of the crown gear are portions of concave spherical surfaces of revolution whose centers 88, 88', 88'' etc. are at the same distance 86 above the pitch plane 87 as the centers of the convex tooth sides are below that plane. The sphere centers of the concave sides of the teeth and of the convex sides of the teeth lie on two circles 89 and 89', respectively which project as straight lines in Figure 6.

To generate two tooth sides of the blank simultaneously, conjugate to the crown gear 83, the axis 90 of the tool 80 must be so inclined as to pass through the center 85 of the convex spherical tooth surface and, also, through the center 88 of the concave spherical tooth surface. The outside cutting edges of the blades 81 of the tool are portions of convex surfaces of the same sphere radius as the convex surfaces of the crown gear tooth which the tool is to represent, while the inside cutting edges of the tool are portions of concave spherical surfaces of the same sphere radius as the concave surfaces of the teeth of the crown gear. The tips 91 of the cutting blades all lie in a plane perpendicular to the axis 90 of the tool.

When the cutter diameter has been suitably selected and the tool inclined in the manner described, a substantially constant dedendum angle will be produced on the blank 82. The tooth surfaces of the blank 82 are produced by providing a rolling generating movement between the cutter 80 and the blank, while rotating the cutter 80 on its axis 90. The generating motion represents a rolling action between the blank and crown gear, of which the cutter constitutes a tooth, in which, preferably, the blank is rotated on its axis 93 and the tool and blank are simultaneously moved relatively to each other about the axis 94 of the crown gear.

Figure 7:
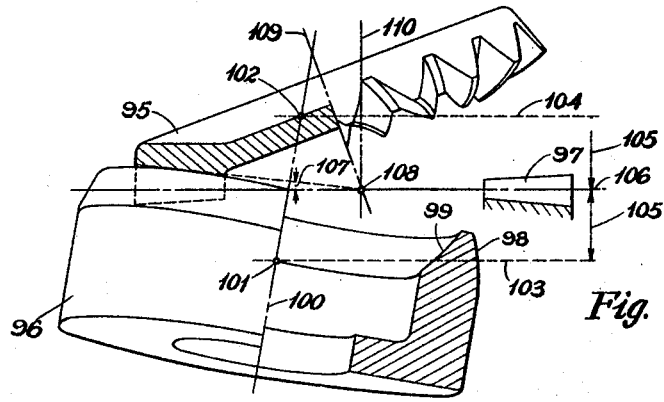
Figure 7 is a side elevation, partly in section, showing a gear, adapted to mesh with the pinion illustrated in Figure 6, being ground.

The gear which is to mate with the pinion 82 will be generated in a similar manner conjugate to a crown gear of opposite hand to the crown gear 83. The cutting tool will again be inclined relative to the blank so that its axis passes through the centers of curvature of the convex and concave sides of the teeth of the crown gear. In Figure 7 is shown a method of grinding the mate gear 95 which is to mesh with the pinion 82. Save for the fact that a grinding wheel is employed instead of a cutting tool, the operation of grinding the tooth surfaces is substantially the same as that already described with reference to the cutting of the tooth surfaces of the pinion. Here the grinding wheel 96 is of a diameter determined in accordance with the principles already set forth and is so positioned relative to the gear 95 to be ground that it represents a basic crown gear 97 which is complementary to the crown gear 83. The outside and inside profiles 98 and 99, respectively, of the grinding wheel are portions of circular arcs, representing the tooth surfaces of the crown gear 97, whose tooth surfaces are portions of spherical surfaces of revolution. The axis 100 of the grinding wheel is so inclined as to pass through the sphere centers 101 and 102 of the convex and concave spherical tooth surfaces of the crown gear, respectively. The centers 101 and 102 are located on two circles 103 and 104, respectively, which appear as straight lines in Figure 7, which are, respectively, the same distances 105 below and above the pitch plane 106 of the crown gear, as are the circles 89 and 89', of Figure 6, above and below the pitch plane 87 of the crown gear 83.

By positioning the grinding wheel in the manner described, two adjacent side tooth surfaces of the gear 95 may be ground simultaneously and the gear will have teeth of gradually tapering width and a substantially constant dedendum angle 107. The apex 108 of the gear will lie substantially in the plane of the tip of the grinding wheel, but outside of its tip circle. The tooth surfaces of the gear will be generated by imparting a relative rolling movement between the grinding wheel and gear, as though the gear were meshing with the crown gear 97 which the grinding wheel represents. Thus, the grinding wheel may be rotated on its axis 100 in engagement with the gear and the gear on its axis 109 while simultaneously a relative movement is imparted between the grinding wheel and blank about the axis 110 of the crown gear 97. After two adjacent tooth surfaces of the gear have been ground, the grinding wheel and gear will be withdrawn relatively to each other and the gear indexed. The grinding wheel will then be returned into engagement with the blank and another pair of space defining surfaces ground. The grinding and intermittent indexing will proceed until the gear has been completely ground.

Figure 8:
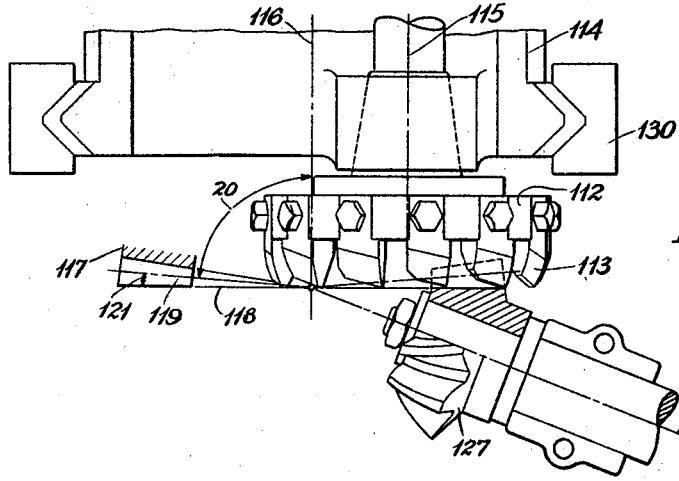
Figures 8 and 9 are a plan view and a side elevation, respectively, illustrating, diagrammatically, the method of producing one member of a pair of spiral bevel gears according to a modification of this invention.
Figure 9:
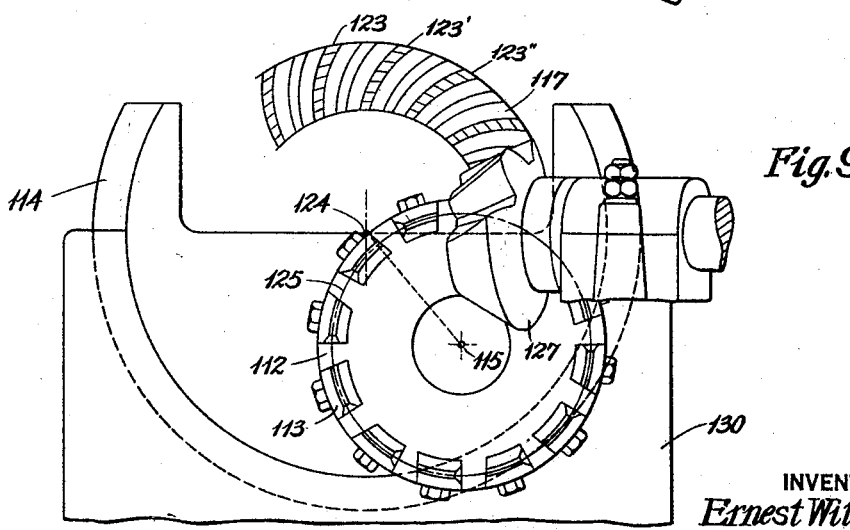

The crown gears shown in Figures 1, 4, 5, 6 and 7 are true crown gears, that is, they are gears having plane pitch surfaces. The present invention is applicable, however, also where the gears to be cut are generated conjugate to basic gears having conical pitch surfaces. Figures 8 and 9 show the application of the present invention to a known form of gear generating machine, the Gleason spiral bevel gear generator, where the tool represents a basic gear having a plane top surface and a conical pitch surface and where the gears cut are generated conjugate to such a basic gear. The tool shown at 112 has a plurality of cutting blades 113 having outside and inside finish cutting edges of circular arc profile. The tool is journaled in a cradle or carrier 114, with its axis 115 parallel to the axis 116 of the cradle or carrier. The tool thus represents a nominal crown gear 117 having a plane tip surface 118 and a conical pitch surface 119. The pitch cone angle 120 of this basic gear 117 is less than 90° usually by the dedendum angle 121 of the blank.

The axis 116 of the cradle represents the axis of the basic gear 117. For the sake of illustration, this basic gear is shown in side elevation in Figure 9. The tip surfaces 123, 123', 123'' of this crown gear are of constant width. They are shown slightly shaded for convenience. The diameter of the cutter 112 is determined according to the principles already described. The plane of its tip surface passes through the apex 124 of the blank, which, however, lies outside the circle 125 of the tips of the cutting blades. The cutter diameter can be determined by the known methods of descriptive geometry. When all other data is the same, the cutter diameter will be found to be very nearly the same whether it represents a true or a nominal crown gear. In each case, the teeth are curved longitudinally to such an extent that the resulting teeth and tooth spaces are only moderately tapered in longitudinal direction, just so much, as will result by the use of a rotary cutting tool when that tool is so positioned as to produce a substantially constant dedendum angle on the blank. The generation of the tooth profiles is carried out according to the methods commonly practised. The cutter 112 is rotated on its axis 115 in engagement with the blank 127. Simultaneously, the blank is rotated on its axis 128 and the cradle 114 is moved on its axis 116 in the guide ways formed in the frame 130. After two space defining tooth surfaces of the blank have been cut, the tool and blank will be withdrawn relatively to each other and the blank indexed. Alternate cutting and indexing will proceed until the blank has been finished.

Figures 8 and 9 show the generation of a pinion. The mate gear might be cut upon the same machine in the same way. To produce mathematically accurate tooth surfaces, however, the basic gears to which a pair are generated conjugate, must be exact counterparts of one another, that is, their pitch cone angles must sum up to 180°. Hence, the pitch cone angle of the basic gear to which the mate gear is to be generated conjugate must be greater than 90° by the same amount that the pitch cone angle 120 of the basic gear 117 to which the pinion 127 is generated conjugate is less than 90°. For the generation of a correct mating gear, therefore, the axis of the tool, instead of being parallel to the axis of the cradle must be so angularly disposed to the axis of the cradle as to represent a basic gear whose pitch cone angle is greater than 90° and the supplement of the pitch cone angle of the nominal crown gear 117 to which the pinion is generated conjugate. The mate gear might be cut upon a machine such as described in my co-pending application, Serial No. 77,310, filed December 23, 1925.

The profile of the cutting tool used with this invention may be varied within wide limits. The side cutting edges of the tool instead of being curved may be straight, as shown in Figure 10, representing a basic gear such as shown in Figure 4 having tooth surfaces which are conical surfaces of revolution. The side cutting edges 132 and 133 of this tool are of straight profile. As a rule, the edges will be inclined at slightly different angles to the axis 134 of the tool, in accordance with the present practise. This tool will be used in the manner already described.

Figure 11 shows a tool, such as might be employed where a concentration of tooth bearing or mis-match might be desired. The outer convex profile 135 is an arc of the circle having a center 136 and a radius 137, while the inner concave profile 138 is an arc of the circle having a center 139 and a radius 140. The axis 141 of the tool does not contain the sphere centers 136 and 139.

Figure 13 shows a face mill such as might be employed for form-cutting a gear according to this invention, where the tooth surfaces are produced without a generating roll. This tool is provided with outside and inside cutting edges 142 and 143, respectively, of concave profile. In gear pairs of large reduction, the larger member of the pair may sometimes be advantageously cut with such a form cutter.

Figure 15 shows a gear constructed according to this invention, the view being taken at right angles to the bottom 145 of a tooth space of the gear. The tooth bottoms are of constant angular width along their whole length and are situated on a conical surface, whose apex coincides substantially with the pitch cone apex 146 of the gear, whereby the gear has a substantially constant dedendum angle. The two sides 147 and 148 bounding the tooth face are portions of coaxial surfaces of revolution, if the gear is produced with a formed cutter without a generating roll, or conjugate to such coaxial surfaces of revolution if the gear is produced in a generating process. The axis of the tool is indicated at 149.

Figure 13 is a development of the pitch cones of a pair of gears made in accordance with this invention and especially according to the generating process, where one member of the pair is generated conjugate to a nominal crown gear having a pitch cone angle less than 90° and the other member of the pair is generated conjugate to a basic gear whose pitch cone angle is greater than 90° by the amount that the first basic gear is less than 90°. The two gears in development, naturally, have a common center or apex 150. The shaded areas 151, indicate sections through the teeth of one gear of the pair, while the shaded areas 152 indicate sections through the teeth of the mate gear. 153 indicates the convex pitch lines of the teeth 151, while 154 indicates the concave pitch lines of such teeth. 155 and 156 are, respectively, the convex and concave pitch lines of the teeth 152 of the mate gear.

It will be noted that the teeth do not exactly interfit with each other. The convex pitch lines 153 are somewhat more curved than the concave pitch lines 156, while the concave pitch lines 154 are more curved than the convex pitch lines 155. The tooth bearing, will, therefore, be concentrated in the middle of the teeth. This is an asset as long as it is not exaggerated, inasmuch as it allows for slight inaccuracies in the mountings of the gears. When this tendency of concentrating the tooth bearing becomes too pronounced, as is the case for large pitches and small tooth numbers of the basic crown gear, it is preferable to provide a correction, such correction being made possible by using a different cutter on the two gears of a pair, the gears of Figure 13 being produced with the same cutter.

When two different cutters are used on the pair, the driving sides of the pair may be made to match each other as closely as desired and the concentration of tooth bearing may be confined to the unimportant reverse side of the teeth. When two cutters are used, they will be of slightly different diameter, the outside diameter of one cutter corresponding to the inside diameter of the other cutter, preferably.

Figure 14 is a development of the pitch cones of a pair of gears generated with two different cutters. Here the convex pitch lines 160 of the teeth 161 of one gear match along their entire length the concave pitch lines 162 of the teeth 163 of the mate gear, while the concave pitch lines 164 of the teeth 161 contact only midway of their length with the convex pitch lines 165 of the teeth 163.

Both members of the pairs shown in Figures 13 and 14 may have the two sides defining a tooth space of the gear cut simultaneously according to this invention. The gears of a pair formed according to this invention may be provided with equal or unequal addenda, as in spiral bevel gears of the usual construction. Unequal addenda are frequently recommended for large reductions, the pinion being provided with an increased addendum. The terms "angular width of space" and "angular tooth thickness" apply to the middle of the tooth height, unless otherwise specified. In the case of equal addenda on both gears of a pair, the terms refer to the pitch surface. In the case of a pair of gears with unequal addenda, the angular width of space and the angular tooth thickness are measured somewhat outside of the pitch surface, namely, midway between the outside cone surface and the bottom cone surface of the gears.

Figures 16 to 19 show two different methods of relieving spherical cutting tools, such as may be employed in cutting gears according to this invention. In Figure 16, the tool 168 is shown as provided with a plurality of inserted cutting blades 169, which has outside cutting edges 170 of convex profile, cutting tips 171, and inside cutting edges 172 of concave profile. Here the cutting blades are relieved back of their cutting edges in a direction parallel to the axis 173 of the tool. The form which a cutting blade takes after sharpening is shown in dotted lines at 175. The profile 175 conforms to the profile 170—171—172 and is merely displaced in an axial direction with reference to the original profile.

In Figure 17, the tool 176 is provided with a different kind of relief. The inclination of the convex profile 177 of the cutting blades 179, is greater than that of the convex profile 170 of the blades 169 and here it is necessary to relieve the cutting blades in a direction somewhat oblique to the cutter axis 180 as indicated by the arrow 181. A profile such as would be formed after sharpening is shown in dotted lines at 182. This profile is displaced not only in an axial direction but inwardly also.

Figures 18 and 19 are partial plan views looking in the direction of the axes 173 and 180, respectively, of the tools shown in Figures 16 and 17. The relief lines 183 of the cutting blades 179 of the tool 176 extend inwardly while the relief lines 184 of the cutting blades 169 of the tool 168 remain at a constant distance from the cutter axis 173.

While I have illustrated and described certain preferred embodiments of my invention, it will be understood that the invention is capable of further modification within its limits and the scope of the appended claims, and that this application is intended to cover any variations, uses or adaptations of my invention, following, in general, the principles of the invention including such departures from the present disclosure as come within known or customary practice in the gear art and as may be applied to the essential features hereinbefore set forth and as fall within the limits of the appended claims.

Having thus described my invention, what I claim is:

1. The method of producing a longitudinally curved tooth tapered gear, which consists in cutting its side tooth surfaces two sides simultaneously in an intermittent indexing operation with a rotary annular face mill, provided with a plurality of cutting edges adapted to finish cut adjacent side tooth surfaces of a gear blank, the tips of which are situated in a plane perpendicular to the axis of the tool, by positioning said tool in engagement with a tapered gear blank so that the apex of the blank is situated substantially in the plane of the tips and outside their circle, and rotating said tool in engagement with the blank.

2. The method of producing a longitudinally curved tooth tapered gear, which consists in cutting its side tooth surfaces two sides simultaneously in an intermittent indexing operation with a rotary annular face mill, provided with a plurality of cutting edges adapted to finish cut adjacent side tooth surfaces of the gear blank, the tips of which are situated in a plane perpendicular to the axis of the tool, by positioning said tool in engagement with a tapered gear blank so that the apex of the blank is situated substantially in the plane of the tips and outside their circle, and rotating said tool in engagement with the blank while imparting a relative rolling motion between the tool and blank in the maner of a gear meshing with a basic gear, other than its mate, to generate the tooth profiles.

3. The method of producing a pair of spiral bevel gears, which consists in cutting the side tooth surfaces of each member of the pair two side surfaces simultaneously in an intermittent indexing operation with a rotary annular face mill, provided with a plurality of cutting edges, certain of which are adapted to finish cut one side tooth surface of a gear blank and others the adjacent side tooth surface of a blank, by positioning the selected tool relative to each blank so that the plane containing the tips of the cutting blades of the tool passes substantially through the cone apex of the particular blank, rotating the tool in engagement with the blank and simultaneously imparting a relative rolling movement between the tool and blank in the manner of a gear meshing with a basic gear, other than its mate, the sum of the pitch cone angles of the basic gears to which the pair are generated conjugate equalling 180°.

4. The method of producing a pair of spiral bevel gears, which consists in cutting the side tooth surfaces of each member of the pair two sides simultaneously with rotary annular face mills provided with a plurality of cutting edges, the tips of which lie in a plane perpendicular to the axis of the tool, certain of said cutting edges being adapted to finish cut one side tooth surface and others an adjacent side tooth surface of a gear blank by positioning the tool relative to each blank so that the plane containing the tips of the tool passes through the apex of the blank, and rotating the tool in engagement with the blank, while simultaneously imparting a relative rolling movement between the tool and blank in the manner of a gear meshing with the basic gear, other than its mate, the basic gear, in the case of one member of the pair, having a pitch cone angle less than 90°, and in the case of the other member of the pair, a pitch cone angle which is the supplement of the pitch cone angle of the first basic gear.

5. The method of producing a pair of spiral bevel gears, which consists in cutting the side tooth surfaces of each member of the pair two sides simultaneously with rotary annular face mills, provided with a plurality of cutting edges, the tips of which lie in a plane perpendicular to the axis of the tool, certain of the cutting edges being adapted to finish cut one side tooth surface and others an adjacent side tooth surface of a gear blank, by rotating the tool in engagement with the blank, while rotating the blank on its axis and simultaneously imparting an additional relative movement between the tool and blank about an axis intersecting the blank axis in its apex, the axis of the tool, in the case of one member of the pair, being parallel to the axis about which the additional relative movement takes place, the tool representing thereby a basic gear whose pitch cone angle is less than 90° and the axis of the tool, in the case of the other member of the pair, being so angularly disposed to the axis about which the additional relative movement takes place, that the tool represents a basic gear whose pitch cone angle is the supplement of the pitch cone angle of the first basic gear.

6. The method of producing a pair of spiral bevel gears which consists in cutting the side tooth surfaces of each member of the pair two sides simultaneously by employing rotary annular face mills, provided with a plurality of cutting edges, the tips of which lie in a plane perpendicular to the axis of the tool, certain of the cutting edges of the tool being adapted to finish cut one side tooth surface and others an adjacent side tooth surface of a gear blank, positioning the tool relative to each blank so that the apex of the blank lies in the plane of the tips and outside their circle, rotating the tool in engagement with the blank and simultaneously imparting a relative rolling movement between the tool and blank in the manner of a gear meshing with a basic gear, other than its mate, the sum of the pitch cone angles of the basic gears to which the pair are generated conjugate equalling 180°.

7. The method of producing a pair of spiral bevel gears, which consists in cutting the side tooth surfaces of each member of the pair two sides simultaneously with rotary annular face mills, each provided with a plurality of cutting edges, the tips of which lie in a plane perpendicular to the axis of the tool, certain of said cutting edges being adapted to finish cut one side tooth surface and others an adjacent side tooth surface of a gear blank, rotating the tool in engagement with the blank, while rotating the blank on its axis and simultaneously imparting an additional relative movement between the tool and blank about an axis intersecting the axis of the blank in its apex, the axis of the tool in the case of one member of the pair, being positioned parallel to the axis about which the additional relative movement takes place, the tool representing thereby a basic gear whose pitch cone angle is less than 90° and the axis of the tool in the case of the other member of the pair being so angularly disposed to the axis about which the additional relative movement takes place that the tool represents a basic gear whose pitch cone angle is the supplement of the pitch cone angle of the first basic gear.

8. The method of producing a spiral bevel gear which consists in cutting its side tooth surfaces two sides simultaneously in an intermittent indexing operation with a rotary annular face mill, provided with a plurality of cutting edges certain of which are adapted to finish cut one side tooth face and others an adjacent side tooth face of a gear blank, the tips of the cutting edges lying in a plane perpendicular to the axis of the tool, and the diameter of said tool being so selected that the tooth space cut is of approximately constant angular width, by positioning said tool so that the plane of the tips passes through the cone apex of the blank and rotating said tool in engagement with the blank.

9. The method of producing a spiral bevel gear which consists in cutting its side tooth surfaces two sides simultaneously and curved longitudinally on circular arcs in development with a rotary annular face mill, provided with a plurality of cutting edges, certain of which are adapted to finish cut one side tooth face and others an adjacent side tooth face of a gear blank, the tips of the cutting edges lying in a plane perpendicular to the axis of the tool, and the diameter of the tool being so selected that the tooth space cut will be of approximately constant angular width, by positioning said tool so that the plane of the tips approximately passes through the cone apex of the blank and rotating said tool in engagement with the blank to cut two adjacent side tooth surfaces of the blank simultaneously while simultaneously producing a relative rolling movement between the tool and blank to generate the tooth profiles, indexing the blank, and repeating the described operation until the gear is completed.

10. The method of producing a pair of spiral bevel gears, which consists in cutting the side tooth surfaces of each member of the pair two sides simultaneously by employing, in each case, a rotary annular face mill provided with a plurality of finish cutting edges, certain of which are adapted to finish cut one side tooth face and others an adjacent side tooth face of a gear blank, the tips of the cutting edges lying in a plane perpendicular to the axis of the tool, the diameter of the tool being so selected in each case that the tooth space cut thereby will be of approximately constant angular width, positioning said tool so that it will produce a substantially constant dedendum angle on the blank, and in rotating the tool in engagement with the blank while simultaneously imparting a relative rolling movement between the tool and blank in the manner of a gear meshing with a basic gear, other than its mate, the sum of the pitch cone angles of the basic gears to which the pair are generated conjugate equalling 180°.

11. The method of producing a pair of spiral bevel gears which consists in cutting the side tooth surfaces of each member of the pair two sides simultaneously by employing, in each case, a rotary annular face mill, provided with a plurality of cutting edges, certain of which are adapted to finish cut one and others an adjacent side tooth surface of a gear blank, the tips of the cutting edges lying in a plane perpendicular to the axis of the tool, the diameter of the tool in each case being so selected as to produce tooth spaces on the blank of substantially constant angular width, rotating the tool in engagement with the blank, while rotating the blank on its axis and simultaneously imparting an additional relative movement between the tool and blank about an axis intersecting the blank axis in its apex, the axis of the tool, in the case of one member of the pair, being positioned parallel to the axis about which the last named relative movement takes place, whereby the tool represents a basic gear whose pitch cone angle is less than 90° and the axis of the tool in the case of the other member of the pair being so inclined to the axis about which the additional relative movement takes place, that the tool represents a basic gear whose pitch cone angle is supplementary to the pitch cone angle of the first basic gear.

12. The method of producing a pair of spiral bevel gears which consists in cutting the side tooth surfaces of each member of the pair two sides simultaneously by employing, in each case, a rotary annular face mill, provided with a plurality of finish cutting edges, certain of which are adapted to finish cut one and others an adjacent side tooth face of a gear blank, the diameter of the tool being so selected, in each case, that the tooth space cut thereby will be of substantially constant angular width, rotating said tool, in each case, in engagement with the blank while rotating the blank on its axis and simultaneously producing an additional relative movement between the tool and blank about an axis intersecting the blank axis in its apex, the axis of the tool, in the case of one member of the pair, being positioned parallel to the axis about which the additional relative movement takes place, whereby the tool represents a basic gear whose pitch cone angle is less than 90° and the axis of the tool, in the case of the other member of the pair, being angularly disposed to the axis about which the additional relative movement takes place, so that the tool represents a basic gear whose pitch cone angle is supplementary to the pitch cone angle of the first basic gear.

13. The method of producing a spiral bevel gear which consists in cutting its side tooth surfaces two sides simultaneously in an intermittent indexing operation by positioning a pair of cutting edges, adapted to finish cut adjacent side tooth faces of a gear blank, with reference to a tapered gear blank so as to produce a constant dedendum angle on the blank, and moving said cutting edges across the face of the blank about a common center on radii so selected that the tooth space cut by the finish cutting edges will be of constant width.

14. The method of producing a spiral bevel gear which consists in cutting its side tooth surfaces two sides simultaneously in an intermittent indexing operation by positioning a pair of cutting edges adapted to finish cut adjacent side tooth faces of a gear blank, with reference to a tapered gear blank so as to produce a constant dedendum angle on the blank and moving said edges across the face of the blank about a common center on radii so selected that the tooth space cut by the finish cutting edges will be of constant angular width, while simultaneously producing a relative rolling motion between the cutting edges and blank to generate the tooth profiles.

15. The method of producing a pair of spiral bevel gears which consists in cutting each member of the pair by positioning, in each case, a pair of cutting edges, adapted to finish cut adjacent side tooth faces of a gear blank with reference to the tapered gear blank so as to produce a constant dedendum angle on the blank, and moving said tools across the face of the blank about a common center on radii so selected that the tooth space cut by the cutting edges will be of constant angular width, while simultaneously producing a relative rolling motion between the cutting edges and blank, in each case, in the manner of a gear meshing with a basic gear, the pitch cone angles of the basic gears to which the pair are generated conjugate being supplementary.

16. The method of producing a pair of spiral bevel gears which consists in cutting the side tooth surfaces of each member of the pair by positioning a pair of cutting edges adapted to finish cut adjacent side tooth faces of a gear blank with reference to a tapered gear blank so as to produce a constant dedendum angle on the blank and moving said tools across the face of the blank, in each case, about a common center on radii so selected that the tooth space cut by the finish cutting edges will be of constant angular width and simultaneously producing a relative rolling motion between the cutting edges and blank in the manner of a gear meshing with a basic gear, the pitch cone angle of the basic gear, in the case of one member of the pair, being less than 90°, and in the case of the other member of the pair, being supplementary to the pitch cone angle of the first basic gear.

17. The method of producing a pair of spiral bevel gears which consists in cutting the side tooth surfaces of each member of the pair by positioning a pair of cutting edges adapted to finish cut adjacent side tooth faces of a gear blank, with reference to a tapered gear blank, in each case, so as to produce a constant dedendum angle on the blank, and moving said tools across the face of the blank in paths curved with different radii about a common center while, in each case, simultaneously producing a relative rolling motion between the cutting edges and blank in the manner of a gear meshing with a basic gear, the pitch cone angles of the basic gears to which the two members of the pair are generated conjugate being supplementary.

18. The method of producing a spiral bevel gear which consists in cutting its side tooth surfaces by rotating an annular face mill, having a plurality of finish cutting edges of circular arc profile, in engagement with a tapered gear blank while simultaneously producing a relative rolling motion between the tool and blank in the manner of a gear meshing with a basic gear, other than its mate to produce tooth surfaces on the blank conjugate to spherical surfaces of revolution.

19. The method of producing a pair of spiral bevel gears which consists in cutting the side tooth surfaces of each member of the pair two sides simultaneously by rotating, in each case, an annular face mill having a plurality of cutting edges of circular arc profile, certain of which are adapted to finish cut one and others an adjacent side tooth face of a gear blank, in engagement with a tapered gear blank while simultaneously producing a relative rolling motion between the tool and blank, in each case, corresponding to that of a gear meshing with a basic gear to produce tooth surfaces on the blank conjugate to spherical surfaces of revolution, the pitch cone angles of the basic gears to which the pair are generated conjugate, being supplementary.

20. The method of producing a pair of spiral bevel gears which consists in cutting the side tooth surfaces of each member of the pair two sides simultaneously by rotating an annular face mill, having a plurality of cutting edges of circular arc profile, certain of which are adapted to finish cut one tooth face and others an adjacent tooth face of a gear blank, in engagement with a tapered gear blank, while simultaneously rotating the blank on its axis and producing an additional relative movement between the tool and blank, in each case, about an axis intersecting the blank axis in its apex, the axis of the tool being positioned, in the case of one member of the pair, parallel to the axis about which the additional relative movement takes place, whereby the tool represents a basic gear whose pitch cone angle is less than 90° and the axis of the tool being positioned, in the case of the other member of the pair, so angularly inclined with reference to the axis about which the additional relative movement takes place that the tool represents a basic gear whose pitch cone angle is supplementary to the pitch cone angle of the first basic gear.

21. The method of producing a spiral bevel gear, which consists in generating its side tooth surfaces conjugate to an imaginary basic gear, other than its mate, whose side tooth surfaces are portions of spherical surfaces of revolution, by employing an annular face mill, having finish cutting edges of circular arc profile adapted to finish cut adjacent side tooth faces of a gear blank, positioning said tool so that its axis passes simultaneously through the sphere centers of two adjacent tooth surfaces of the basic gear, and rotating the tool in engagement with the blank while simultaneously imparting a relative rolling motion between the tool and blank corresponding to that of a gear meshing with said basic gear.

22. The method of producing a pair of spiral bevel gears which consists in generating each member of the pair conjugate to an imaginary basic gear having side tooth surfaces which are portions of spherical surfaces of revolution, by employing, in each case, an annular face mill, having finish cutting edges of circular arc profile adapted to finish cut adjacent side tooth faces of a gear blank, positioning said tool so that its axis passes simultaneously through the sphere centers of two adjacent tooth surfaces of the basic gear and rotating said tool in engagement with the gear blank while simultaneously producing a relative rolling motion between the tool and blank in the manner of a gear meshing with the basic gear, the pitch cone angles of the basic gears to which the pair are generated conjugate being supplementary.

23. The method of producing a pair of spiral bevel gears which consists in generating each member of the pair conjugate to an imaginary basic gear having side tooth surfaces which are portions of spherical surfaces of revolution, by employing an annular face mill having finish cutting edges of circular arc profile adapted to finish cut adjacent side tooth faces of a gear blank, by positioning said tool, in each case, so that its axis passes simultaneously through the sphere centers of adjacent tooth faces of the basic gear, and rotating said tool in engagement with a tapered gear blank while simultaneously producing a relative rolling motion between the tool and blank in the manner of a gear meshing with a basic gear, the axis of the tool being positioned in the case of one member of the pair, parallel to the axis of the basic gear, whereby the tool represents a basic gear whose pitch cone angle is less than 90° and the axis of the tool being so angularly disposed with reference to the axis of the basic gear, in the case of the other member of the pair, that the pitch cone angle of the second basic gear is supplementary to the pitch cone angle of the first basic gear.

24. The method of producing a pair of spiral bevel gears, which consists in cutting the side tooth surfaces of each member of the pair two sides simultaneously by rotating, in each case, an annular face mill having finish cutting edges of circular arc profile adapted to finish cut adjacent side tooth faces of a gear blank, in engagement with a tapered gear blank while simultaneously producing a relative rolling motion between the tool and blank in the manner of a gear meshing with a basic gear, other than its mate, tools of identical construction being employed in producing the two members of the pair.

25. The method of producing a pair of spiral bevel gears which consists in positioning, in each case, a rotary annular face mill, having finish cutting edges adapted to finish cut adjacent side tooth faces of a gear blank, in relation to the blank so as to produce a constant dedendum angle on the blank, and rotating said tool in engagement with the blank while simultaneously producing an additional relative movement between the tool and blank corresponding to that of a gear meshing with a basic gear, the pitch cone angles of the basic gears to which the pair are generated conjugate being supplementary, tools of identical construction being used in generating both members of the pair.

26. The method of producing a pair of spiral bevel gears, which consists in cutting each member of the pair with rotary annular face mills of identical construction, having finish cutting edges adapted to finish cut adjacent side tooth faces of a gear blank, by positioning, in each case, the face mill relative to a tapered gear blank so as to produce a constant dedendum angle on the blank, the radius of the face mill being so chosen as to produce a tooth space of substantially constant angular width on the blank, and rotating said tool in engagement with the blank while simultaneously producing a relative rolling motion between the tool and blank to generate the tooth profiles.

ERNEST WILDHABER.